(12) United States Patent
Muehlmann et al.

(10) Patent No.: US 10,367,667 B2
(45) Date of Patent: Jul. 30, 2019

(54) JOINT AD-HOC SIGNAL AND COLLISION DETECTION METHOD

(71) Applicant: NXP B.V., Eindhoven (NL)

(72) Inventors: Ulrich Andreas Muehlmann, Graz (AT); Ulrich Neffe, Albersdorf-Prebuch (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/719,687

(22) Filed: Sep. 29, 2017

(65) Prior Publication Data

US 2019/0104003 A1 Apr. 4, 2019

(51) Int. Cl.
*G06K 7/10* (2006.01)
*H04L 27/22* (2006.01)
*H04B 5/00* (2006.01)

(52) U.S. Cl.
CPC .......... *H04L 27/22* (2013.01); *G06K 7/10019* (2013.01); *G06K 7/10029* (2013.01); *H04B 5/0056* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,004,237 A | * | 1/1977 | Kratzer | G01S 11/08 327/156 |
| 4,095,226 A | * | 6/1978 | Kratzer | G01S 11/08 342/393 |
| 4,428,061 A | * | 1/1984 | Skinner | H02J 13/0037 375/327 |
| 5,684,841 A | * | 11/1997 | Chiba | H04L 7/0337 327/141 |
| 5,848,109 A | * | 12/1998 | Marbot | H04L 7/0337 375/355 |
| 5,920,287 A | * | 7/1999 | Belcher | G01S 5/021 342/450 |
| 5,995,046 A | * | 11/1999 | Belcher | G01S 1/042 342/450 |

(Continued)

FOREIGN PATENT DOCUMENTS

| | | |
|---|---|---|
| CN | 102622564 | 8/2012 |
| CN | 103927505 | 7/2014 |

OTHER PUBLICATIONS

Bletsas, A. et al. "Single-Antenna Coherent Detection of Collided FM0 RFID Signals", IEEE Transactions on Communications, vol. 60, No. 3, pp. 756-766 (Mar. 2012).

(Continued)

*Primary Examiner* — Linda Wong (57) ABSTRACT

Various embodiments relate to a method for classifying received radio frequency signals, including: receiving an input signal; matched filtering the input signal to produce a correlation result signal; sampling the correlation result signal at a plurality of half-bit-grids and a plurality of bit-grids to produce a set of modulated phase correlation result samples and a set of non-modulated phase correlation result samples; calculating a minimum of the set of modulated phase correlation result samples; calculating a maximum of the set of non-modulated phase correlation result samples; and classifying the input signal as valid data or collision data based on the minimum and the maximum.

16 Claims, 6 Drawing Sheets

(56) References Cited

U.S. PATENT DOCUMENTS

| | | | | |
|---|---|---|---|---|
| 6,459,888 B1* | 10/2002 | Clark | ............... | H04L 27/22 375/326 |
| 6,721,365 B1* | 4/2004 | Yin | ............... | H04L 7/042 375/261 |
| 7,565,286 B2* | 7/2009 | Gracie | ............... | G01N 22/02 704/207 |
| 7,634,034 B2* | 12/2009 | Larsson | ............... | H04B 1/71637 370/512 |
| 7,768,448 B2* | 8/2010 | Tyree | ............... | F41G 7/2213 342/195 |
| 7,881,409 B2* | 2/2011 | Ghovanloo | ............... | H03D 3/006 375/334 |
| 7,940,615 B2* | 5/2011 | Serrano | ............... | G11B 7/0053 369/44.13 |
| 8,259,832 B2* | 9/2012 | Feher | ............... | H04L 27/34 375/261 |
| 8,401,103 B2* | 3/2013 | Iwamura | ............... | H04B 1/7093 375/146 |
| 8,682,311 B2* | 3/2014 | Mohebbi | ............... | H04B 7/15542 375/211 |
| 9,379,776 B2* | 6/2016 | Pozsgay | ............... | H04B 1/04 |
| 2001/0030697 A1* | 10/2001 | Dischert | ............... | H04N 9/093 348/263 |
| 2003/0040877 A1* | 2/2003 | Warburton | ............... | G01T 1/185 702/78 |
| 2003/0063621 A1* | 4/2003 | Tzou | ............... | H04L 12/413 370/445 |
| 2004/0130438 A1 | 7/2004 | Garber | | |
| 2004/0141499 A1* | 7/2004 | Kashima | ............... | H04J 14/005 370/380 |
| 2006/0007985 A1* | 1/2006 | Larsson | ............... | H04B 1/71637 375/130 |
| 2006/0007986 A1* | 1/2006 | Larsson | ............... | H04B 1/71637 375/130 |
| 2006/0126454 A1* | 6/2006 | Serrano | ............... | G11B 7/0053 369/44.13 |
| 2007/0069864 A1* | 3/2007 | Bae | ............... | H04B 5/0062 340/10.2 |
| 2008/0273430 A1* | 11/2008 | Serrano | ............... | G11B 7/0053 369/47.19 |
| 2009/0016273 A1* | 1/2009 | Kanterakis | ............... | H04W 74/008 370/328 |
| 2010/0066596 A1* | 3/2010 | Tyree | ............... | F41G 7/2213 342/195 |
| 2010/0148929 A1* | 6/2010 | Wu | ............... | G06K 7/0008 340/10.1 |
| 2011/0006885 A1 | 1/2011 | Park | | |
| 2011/0058593 A1* | 3/2011 | Chiang | ............... | H04L 7/10 375/219 |
| 2011/0133895 A1* | 6/2011 | Wu | ............... | G06K 7/0008 340/10.1 |
| 2011/0196615 A1* | 8/2011 | Vitali | ............... | G06K 9/0051 702/19 |
| 2011/0285572 A1* | 11/2011 | Alon | ............... | G01S 7/285 342/37 |
| 2014/0086347 A1* | 3/2014 | Kang | ............... | H04B 5/0031 375/259 |
| 2015/0092714 A1* | 4/2015 | Kanterakis | ............... | H04W 74/008 370/329 |
| 2015/0208253 A1* | 7/2015 | Kim | ............... | H04W 24/02 370/252 |
| 2016/0112223 A1* | 4/2016 | Kitsukawa | ............... | H04L 25/4904 375/346 |
| 2017/0346620 A1* | 11/2017 | Bucci | ............... | H04L 7/048 |
| 2018/0032768 A1* | 2/2018 | Ganesan | ............... | G06K 7/10297 |
| 2018/0076987 A1* | 3/2018 | Poulton | ............... | H04L 25/03878 |
| 2019/0104003 A1* | 4/2019 | Muehlmann | ............... | H04L 27/22 |

OTHER PUBLICATIONS

"ISO/IEC 14443-3 Identification cards—Contactless integrated circuit(s) cards—Proximity cards—Part 3: Initialization and anticollision", ISO/IEC JTC1/SC17 N 1531, 48 pgs. (Jun. 11, 1999).

* cited by examiner

JOINT AD-HOC SIGNAL AND COLLISION DETECTION METHOD

TECHNICAL FIELD

This disclosure relates generally to telecommunications systems, and more specifically, but not exclusively, to classifying received radio frequency signals as valid data, collision data, or invalid data using signal level statistics.

BACKGROUND

Radio Frequency Identification (RFID) uses electromagnetic fields to identify and track tags attached to objects. The RFID tags contain identity information. In response to the interrogating signals from the RFID readers, the RFID tags may communicate a response signal and allow identification by the reader. RFID technology is now used in a lot of commercial and industrial activities. For example, an RFID tag attached to a car during production can be used to track its progress through the assembly line; attaching RFID tags to livestock allows for identification of animals; and an RFID tag attached to pharmaceuticals can be used to track the pharmaceuticals through warehouses.

ISO/IEC 14443 is an international standard that defines proximity cards used for identification, and the transmission protocols for communicating with it. Collision resolution is an integral part of the ISO/IEC 14443A collision aware protocol. During Request Type A (REQA) and Answer to Request Type A (ATQA) initialization sequences, misinterpretation of the decoded bits may occur because the ATQA response is short without cycle redundancy check. Other reasons for misinterpretation include insufficient signal to noise ratio (SNR), an initial collision of a plurality of RFID tags, or a mixture of both. Full anti-collision protocols can be used to prevent the collisions. In addition, the collisions when they occur can be detected and classified to provide more precise interpretation of the decoded response signals.

SUMMARY OF EXEMPLARY EMBODIMENTS

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method for classifying received radio frequency signals, including: receiving an input signal; matched filtering the input signal to produce a correlation result signal; sampling the correlation result signal at a plurality of half-bit-grids and a plurality of bit-grids to produce a set of modulated phase correlation result samples and a set of non-modulated phase correlation result samples; calculating a minimum of the set of modulated phase correlation result samples; calculating a maximum of the set of non-modulated phase correlation result samples; and classifying the input signal as valid data or collision data based on the minimum and the maximum.

Various embodiments are described, wherein sampling the correlation result signal at the plurality of half-bit-grids and the plurality of bit-grids to produce a set of modulated phase correlation result samples and a set of non-modulated phase correlation result samples includes: sampling the correlation result signal at the half-bit-grid and the bit-grid of each of a plurality of bits to produce a plurality of half-bit-grid sampled values and a plurality of bit-grid sampled values; conducting a comparison of the half-bit-grid sampled values and the bit-grid sampled values associated with each of the plurality of bits; assigning a greater value of each comparison to a set of modulated phase correlation result samples; and assigning a lesser value of each comparison to a set of non-modulated phase correlation result samples.

Various embodiments are described, wherein classifying the input signal as valid data or collision data based on the minimum and the maximum includes: subtracting the maximum from the minimum to produce a guard distance; classifying the input signal as valid data when the maximum is not greater than the guard distance; and classifying the input signal as collision data when the maximum is greater than the guard distance.

Various embodiments are described, further including: classifying the input signal as invalid data when the guard distance is less than a predetermined threshold.

Various embodiments are described, wherein classifying the input signal as valid data or collision data based on the minimum and the maximum includes: classifying the input signal as invalid data when the maximum is not smaller than the product of the minimum and a first slope or when the minimum is not greater than a noise invalid threshold; classifying the input signal as collision data when the maximum is not smaller than the product of the minimum and a second slope, the maximum is greater than a noise collision threshold, and the input signal is not classified as invalid data; and classifying the input signal as valid data when the input signal is not classified as invalid data and the input signal is not classified as collision data.

Various embodiments are described, wherein the classifying depends on a waiting-for-data state or a receiving-data state.

Various embodiments are described, wherein the classifying is conducted between invalid data and valid data during the waiting-for-data state; and the classifying is conducted between valid data and collision data during the receiving-data state.

Various embodiments are described, wherein the classifying is conducted based on a first 5 bits, 4 bits, 2 bits, or 1 bit of the input signal.

Further, various exemplary embodiments relate to a collision detection system for classifying received radio frequency signals, including: a receiver configured to receive an input signal; a matched filter configured to matched filter the input signal to produce a correlation result signal; a collision detector configured to: sample the correlation result signal at a plurality of half-bit-grids and a plurality of bit-grids to produce a set of modulated phase correlation result samples and a set of non-modulated phase correlation result samples; calculate a minimum of the set of modulated phase correlation result samples; calculate a maximum of the set of non-modulated phase correlation result samples; and classify the input signal as valid data or collision data based on the minimum and the maximum.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

Embodiments described herein address using signal level statistics to classify a received radio frequency signal as valid data, collision data, or invalid data (noise).

Figure 1:
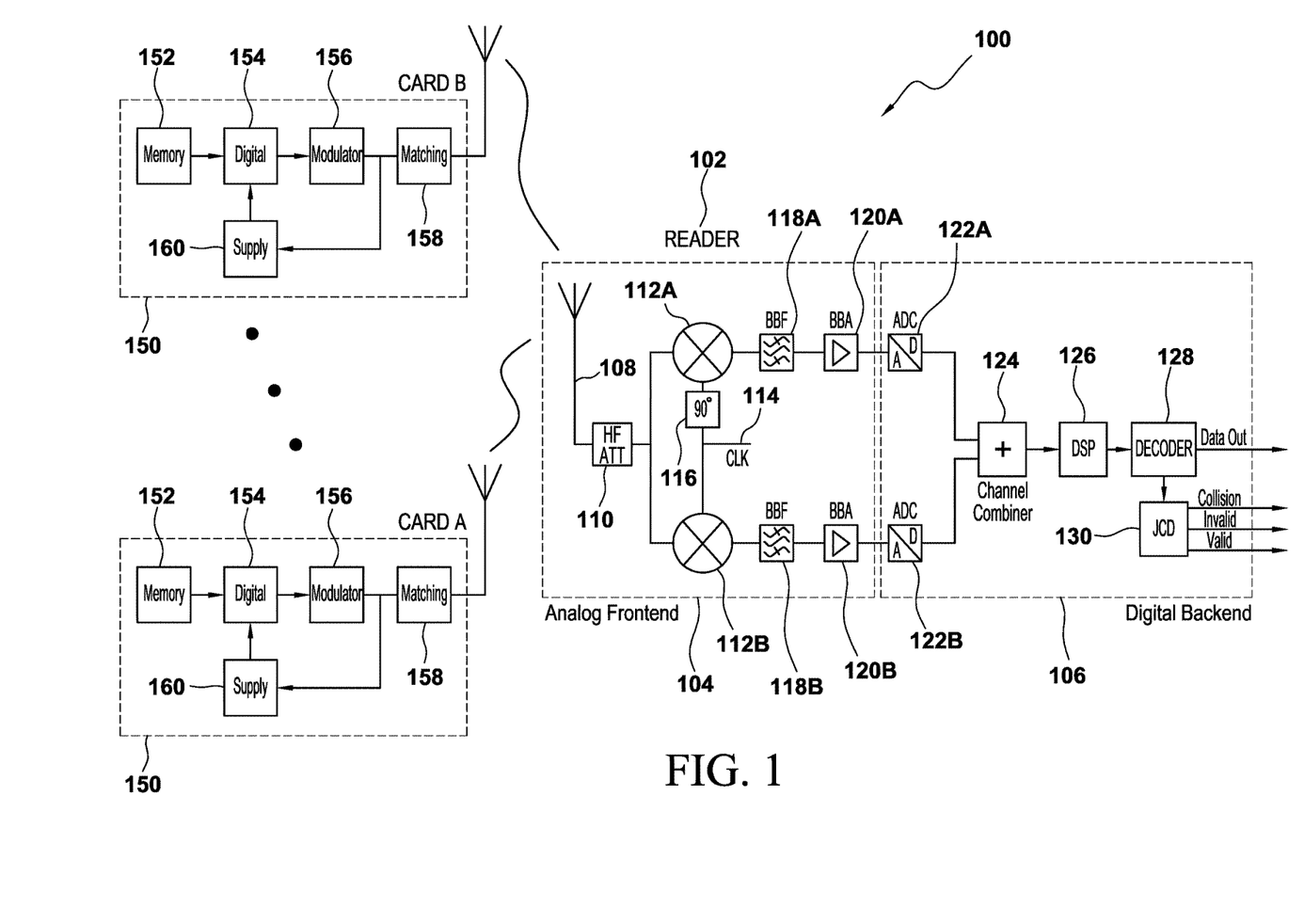
FIG. 1 illustrates a block diagram of an RFID (Radio Frequency Identification) system.

FIG. 1 illustrates a block diagram of an RFID (Radio Frequency Identification) system 100. The RFID system 100 includes a reader 102 and one or more cards 150. The reader 102 includes an analog frontend 104 and a digital backend 106. The analog frontend 104 includes an antenna 108, a high frequency attenuator 110, two mixers 112A, 112B, a clock signal 114, a ninety degree phase shifter 116, two base band filters 118A, 118B, and two base band amplifiers 120A, 120B.

The antenna 108 may receive a radio frequency (RF) signal from the readers 150. The RF signal may be processed by the high frequency attenuator 110, which reduces the power of the RF signal. The RF signal is then input into the mixers 112A, 112B. The clock signal 114 is input into the mixer 112B. The clock signal 114 is input into the mixer 112A after the clock signal 114 goes through a ninety degree phase shifter 116. The mixers 112A, 112B may multiply two signals and may be used to shift signals from one frequency range to another. The signals produced by the mixers 112A, 112B may go through the base band filters 118A, 118B, and then the base band amplifiers 120A, 120B. The base band filters 118A, 118B may filter out the high frequency components of the mixed signals and retain the base band components. The base band amplifiers 120A, 120B may increase the power of the filtered signals.

The digital backend 106 includes two ADCs (analog to digital converters) 122A, 122B, a channel combiner 124, a DSP processor 126, a decoder 128, and a joint signal and collision detector 130. The signals produced by the base band amplifiers 120A, 120B may be sampled by the ADCs 122A, 122B to produce two digital signals that are representative of the signals produced by the base band amplifiers 120A, 120B. The two digital signals may be combined by the channel combiner 124 and the output of the channel combiner 124 may be processed by the DSP processor 126. The DSP processor 126 may be programmed to perform matched filtering of its input signal to produce a correlation result signal. The correlation result signal may be sampled by the decoder 128, which may then compare the sampled correlation results to produce the encoded data and the modulated phase correlation result samples and non-modulated phase correlation result samples. The modulated phase correlation result samples and non-modulated phase correlation result samples may be used by the joint signal and collision detector 130 to classify the received radio frequency signal as valid data, collision data, or invalid data.

Each of the readers 150 includes a memory 152, a digital control unit 154, a modulator 156, a matching component 158, a supply 160, and an antenna 162. The antenna 162 may receive an interrogation signal from the reader 102. The matching component 158 may perform impedance matching. The received signal may be input to the supply 160, which may use the signal to generate power to the digital control unit 154. Upon receiving the signal, the digital control unit 154 may process the signal and generate a response signal. The digital control unit 154 may use the memory 152 coupled to it to store data. The response generated by the digital control unit 154 may be modulated by the modulator 156, and then sent to the reader through the antenna 162.

In one embodiment, the reader 102 may send a Request Type A (REQA) to the cards 150. One or more of the cards 150 may respond by sending an Answer to Request Type A (ATQA). The reader 102 may then receive the ATQA and classify the ATQA as valid data, collision data, or invalid data.

Figure 2:
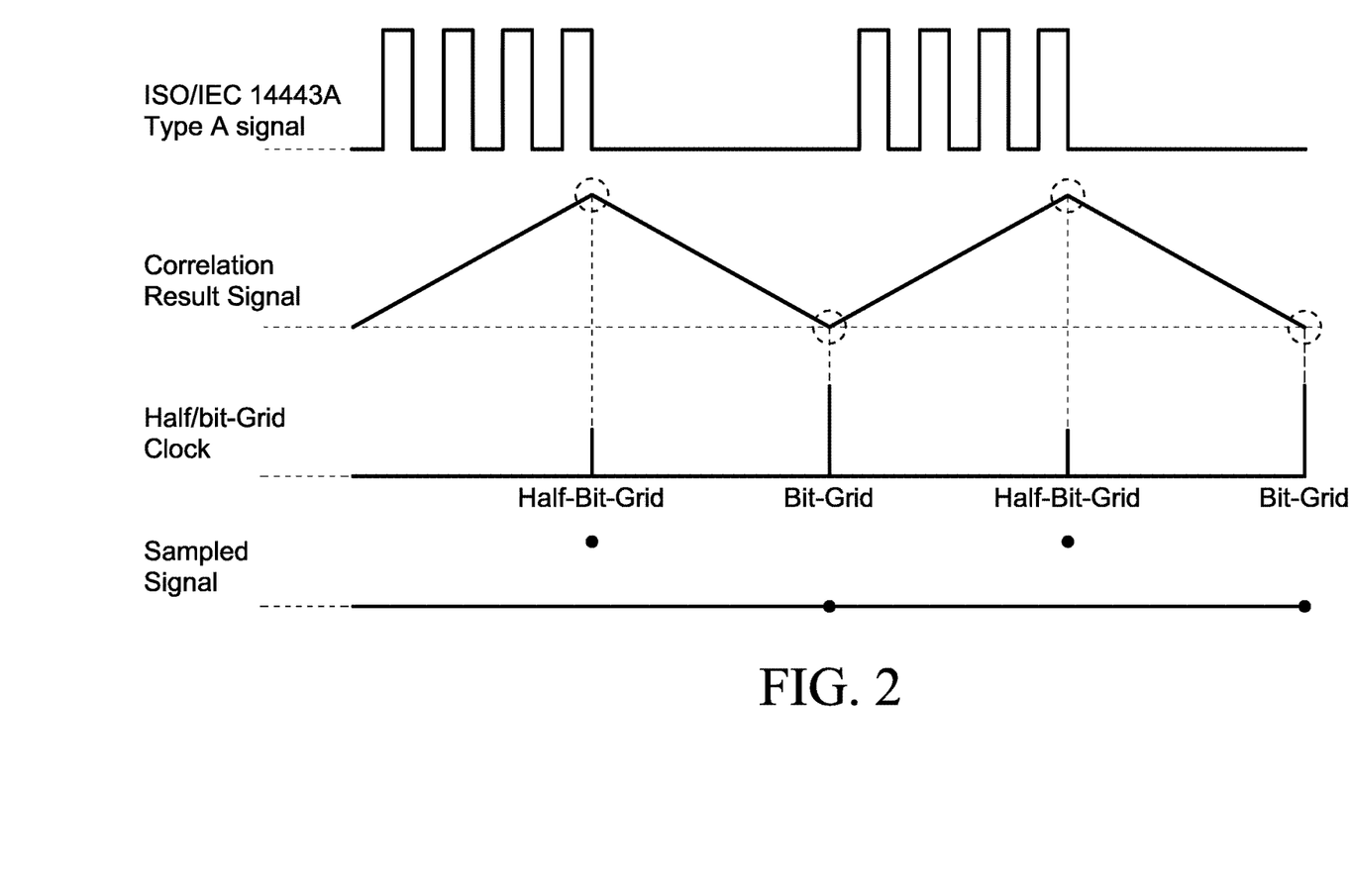
FIG. 2 illustrates an exemplary diagram showing various signals.

FIG. 2 is an exemplary diagram showing various signals. FIG. 2 shows in the first line an ISO/IEC 14443A Type A signal with a data rate of 106 k bit per second. Other signals may also be used. A matched filter may process the ISO/IEC 14443A Type A signal and a correlation result signal may be produced, as shown in the second line in FIG. 2.

FIG. 2 shows in the third line a half-bit-grid/bit-grid clock. The half-bit-grid/bit-grid clock has the same period and the same starting point as the ISO/IEC 14443A Type A signal. Each period can also be called a bit. A half-bit-grid is located at the half point of each bit of the half-bit-grid/bit-grid clock. A bit-grid is located at the end point of each bit of the half-bit-grid/bit-grid clock.

The correlation result signal may be sampled at the half-bit-grids and the bit-grids. The correlation result signal as sampled at the half-bit-grids and the bit-grids can be called the sampled signal, as shown in the fourth line of FIG. 2.

The two sampled values associated with each bit are compared. The data encoded in the ISO/IEC 14443A Type A signal may be decoded based on the comparison. If the sampled value at the bit-grid of a particular bit is greater than the sampled value at the half-bit-grid of the same bit, the encoded data is a logic "0." If the sampled value at the bit-grid of a particular bit is smaller than the sample value at the half-bit-grid of the same bit, the encoded data is a logic "1." In addition, the greater value of each comparison may be assigned as a modulated phase correlation result sample, and the smaller value of each comparison may also be assigned as a non-modulated phase correlation result sample. These two types of samples may be used to classify the received radio frequency signal according to the methods discussed below.

FIGS. 3A-D illustrate exemplary diagrams showing sampled signals and the corresponding histograms. These diagrams illustrate the principles underlying the method for classifying a received RF signal. In FIGS. 3A-D, the sampled signals are on the left side and the histograms are on the right side. x[n] denotes the value of the correlation result signal sampled at the half-bit-grid of a particular bit n. h[n] denotes the value of the correlation result signal sampled at the bit-grid of a particular bit n. The vertical axis of the histogram is the distance between x[n] and h[n], i.e., the absolute value of x[n] minus h[n]. The distance between x[n] and h[n] is also called guard distance. The horizontal axis of the histogram is the magnitude of the histogram function.

Figure 3A:
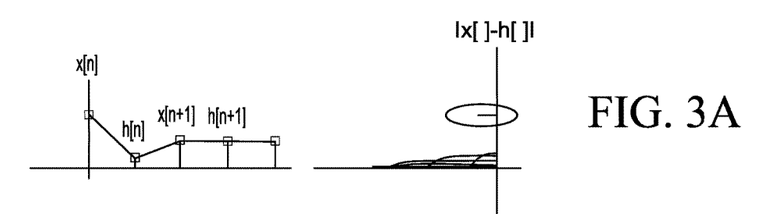
FIGS. 3A-D illustrate exemplary diagrams showing sampled signals and the corresponding histograms.

FIG. 3A illustrates an exemplary diagram showing a sampled signal and histogram corresponding to a scenario where there is inverse card collision, i.e., the RF signal received by the reader 102 is composed of two superposed response signals, each response signal coming from a different card 150, where the two response signals carry inversed data except for the first bit. For example, the response signal from a first card 150 may be 1000111 and the response signal from a second card 150 may be 1111000. The two response signals will superpose. They may be received and processed by the reader 102. The resulting sampled signal is illustrated in FIG. 3A. As the histogram shows, on inverse card collision, only the first bit has a guard distance that does not approximate zero. All other bits have a guard distance that approximate zero.

Figure 3B:
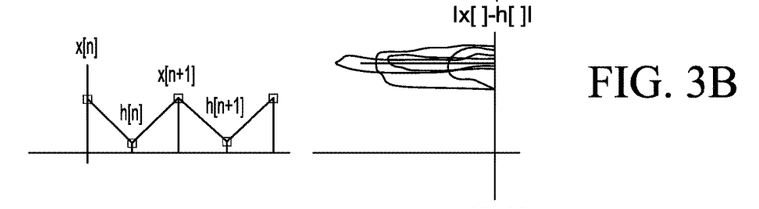

FIG. 3B illustrates an exemplary diagram showing a sampled signal and histogram corresponding to a scenario where there is valid data reception. In this scenario, the guard distance of every bit on the histogram is located far away from zero.

Figure 3C:
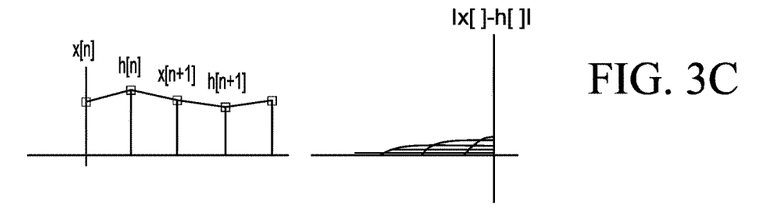

FIG. 3C illustrates an exemplary diagram showing a sampled signal and histogram corresponding to a scenario where there is a great amount of noise such that the signal to noise ratio (SNR) is low. In this scenario, the guard distances of the bits are centered near zero.

Figure 3D:
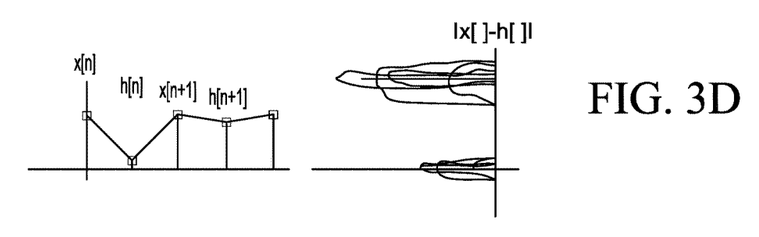

FIG. 3D illustrates an exemplary diagram showing a sampled signal and histogram corresponding to a scenario where there is regular collision. The distribution shows two regions, one centered near zero and the other centered far away from zero. FIGS. 3A-D show that different types of received RF signals have different guard distance distributions, and hence, the received RF signals may be classified based on their guard distance.

Figure 4A:
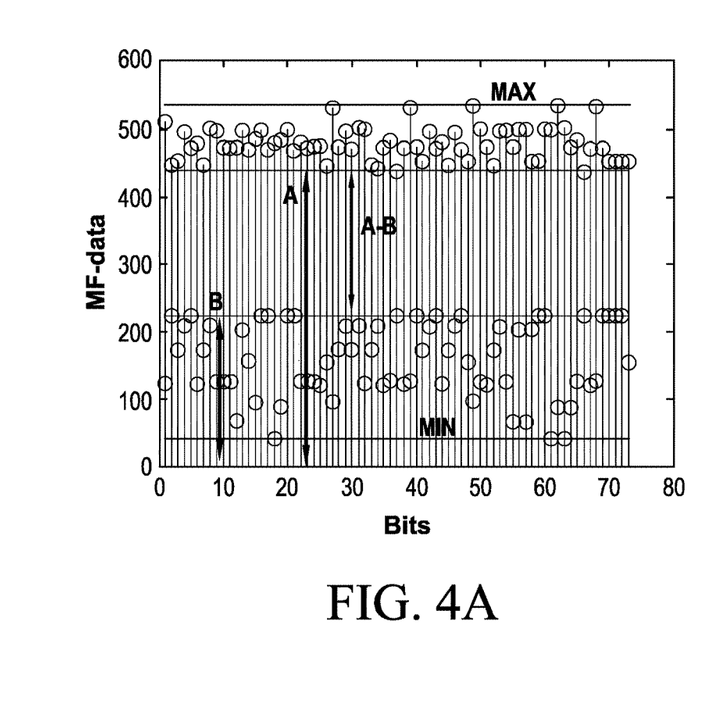
FIGS. 4A-B illustrate exemplary diagrams showing the method for classifying the received RF signal as valid data or collision data.
Figure 4B:
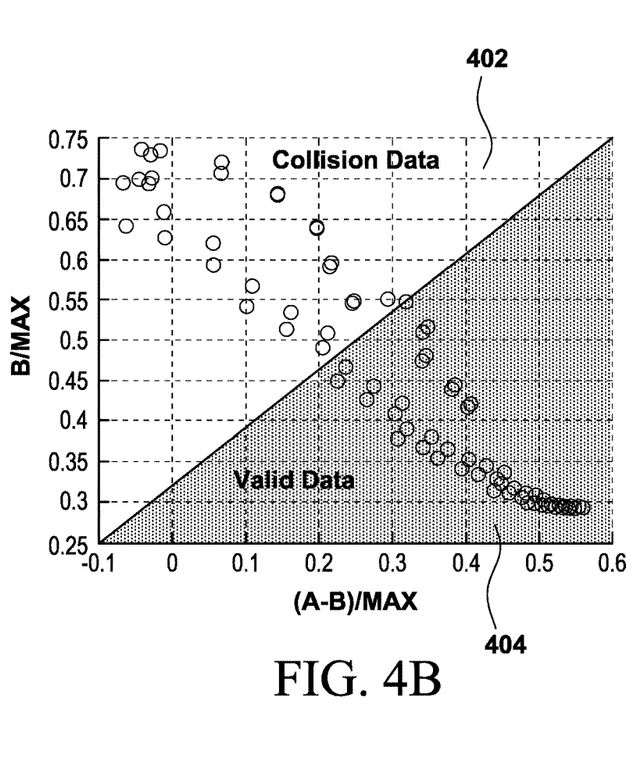

FIGS. 4A-B illustrate exemplary diagrams showing the method for classifying the received RF signal as valid data or collision data. A set of modulated phase correlation result samples and a set of non-modulated phase correlation result samples may be calculated as discussed above in connection with FIG. 2. A variable A and a variable B may be calculated over the set of modulated phase correlation result samples and the set of non-modulated phase correlation result samples. The variable A represents the minimum of the set of modulated phase correlation result samples, and the variable B represents the maximum of the set of non-modulated phase correlation result samples. A variable GD is defined as the guard distance of all the bits of the received RF signal. GD equals A minus B. Additionally, a variable MAX and a variable MIN are calculated for the purpose of normalization. MAX equals the maximum of the set of modulated phase correlation result samples and MIN equals the minimum of the set of non-modulated phase correlation result samples. The foregoing calculations can be summarized in the following equations:

$$A=\min\{\operatorname{mod}[n],\operatorname{mod}[n+1],\ldots,\operatorname{mod}[n+k]\};$$

$$B=\max\{\operatorname{unmod}[n],\operatorname{unmod}[n+1],\ldots,\operatorname{unmod}[n+k]\};$$

$$\mathrm{MAX}=\max\{\operatorname{mod}[n],\operatorname{mod}[n+1],\ldots,\operatorname{mod}[n+k]\};$$

$$\mathrm{MIN}=\min\{\operatorname{unmod}[n],\operatorname{unmod}[n+1],\ldots,\operatorname{unmod}[n+k]\}; \text{ and}$$

$$GD=A-B,$$

wherein mod denotes the set of modulated phase correlation result samples, mod[n] denotes the modulated phase correlation result sample associated with bit n, unmod denotes the set of non-modulated phase correlation result samples, unmod[n] denotes the non-modulated phase correlation result sample associated with bit n, and k denotes the length of the window over which the variables are calculated.

In one embodiment, the reader 102 may receive a negative acknowledge response (NAK response). The NAK response is composed of a state of frame (SOF) bit and 4 other bits. In this example, the reader 102 may be programmed to conduct the classification of the received RF signal based on the 5 bits (including the SOF bit and the 4 other bits). The length of the window k may be set as 5. In another embodiment, the classification may be conducted using the first 4 bits of the received RF signal. In this case, the length of the window k may be set as 4.

In another embodiment, the classification may be conducted using only one current bit. In this case, the length of the window k may be set as 1, and the variables A, B, GD, MAX, and MIN will be calculated based on the only one current bit.

In another embodiment, the classification may be conducted using two bits, where the first one is the SOF bit and the second one is the current bit under evaluation. In this case, the length of the window may be set as 2. It should be noted that classification using two bits is recommended when there is moderate SNR, high signal strength condition, or conditions where the signal threshold is already known.

FIG. 4A illustrates the calculation of the variables A, B, GD, MAX, and MIN. The horizontal axis is the bit of the received RF signal. The vertical axis is the value of the modulated phase correlation result sample or the non-modulated phase correlation result sample associated with each bit of the received RF signal. The variables are illustrated on the diagram.

For classifying the received RF signal as valid data or collision data, a comparison of GD and B may be conducted.

If GD is greater than B, the received RF signal is classified as valid data. If GD is smaller than B, the received RF signal is classified as collision data. A first order classifier is proposed as the following:

$$\tilde{k} = GD > B;$$

$$\text{Collision data} = \begin{cases} 1, & \text{if } \tilde{k} = 0 \\ 0, & \text{otherwise} \end{cases}; \text{ and}$$

$$\text{Valid data} = \begin{cases} 1, & \text{if } \tilde{k} = 1 \\ 0, & \text{otherwise} \end{cases}.$$

FIG. 4B illustrates the classification of the received RF signal as valid data or collision data. The horizontal axis is normalized GD, i.e., GD/MAX, and the vertical axis is normalized B, i.e., B/MAX. The received RF signals falling within area 402 are classified as collision data. The received RF signals falling within area 404 are classified as valid data.

Figure 5:
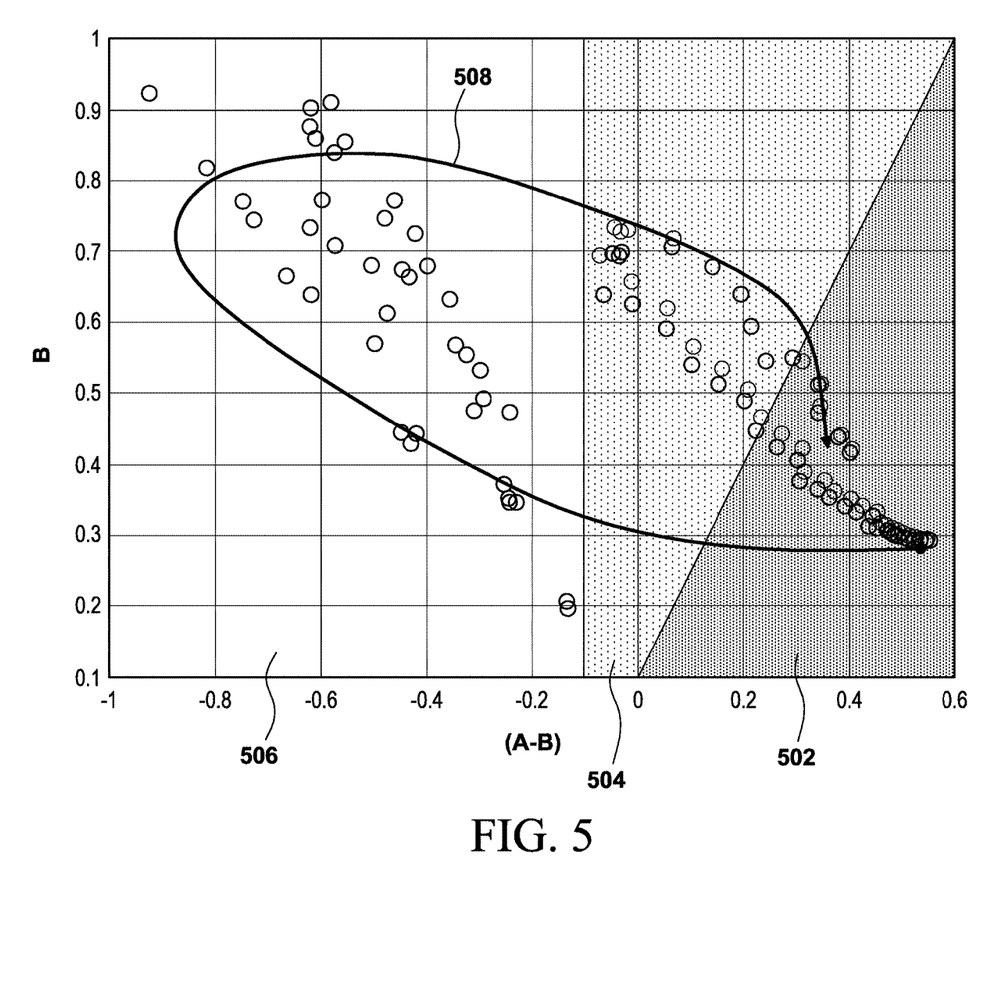
FIG. 5 illustrates the classification of the received RF signal as valid data, collision data, or invalid data.

FIG. 5 illustrates the classification of the received RF signal as valid data, collision data, or invalid data. In this embodiment, the received RF signal is classified as invalid data when GD/MAX is below −0.1. It should be noted that all the thresholds, including the threshold of −0.1 here, are system parameters and can be adjusted to fit the application needs. There might be some false positives in the sense of treating collision data as invalid data. But it is assumed that only in very noisy conditions may these false positives occur. The received RF signals falling within area 502 are classified as valid data. The received RF signals falling within area 504 are classified as collision data. The received RF signals falling within area 506 are classified as invalid data.

The trajectory 508 shows a series of modulation strength ratios from 1/10 to 4/1. The modulation strength ratio is the ratio between the modulation strength of the response signal from one card 150 and the modulation strength of the response signal from another card 150. The trajectory 508 shows a series of modulation strengths ratios with logarithmic increments. That is why at the end of the trajectory only 4 to 5 cases are classified as valid data. FIG. 5 shows that $\tilde{k}$ is largely independent of the bit distribution of the individual response signals of the cards 150.

The methods discussed above may be generalized. The generalized method can be summarized in the following equations:

The received RF signal is $$\begin{cases} \text{invalid,} & \text{if } B \geq X1*A \text{ or } A \leq NIT \\ \text{collision,} & \text{if } B \geq X2*A \text{ and } B > NCT \text{ and not invalid} \\ \text{valid,} & \text{if not invalid and not collision} \end{cases}.$$

In the equation, X1, NIT, X2, and NCT are all system parameters and can be adjusted to fit the application needs. X1 is the slope of the line distinguishing invalid data and collision data. The default value of X1 may be 0.125. X2 is the slope of the line distinguishing collision data and valid data. The default value of X2 may be 0.125. NIT is the noise invalid threshold. When A is below NIT, the received RF signal is classified as invalid data regardless of whether other conditions are met. NCT is the noise collision threshold. The received RF signal that otherwise would be classified as collision data is classified as valid data if the variable B associated with the received RF signal is below NCT.

Figure 6:
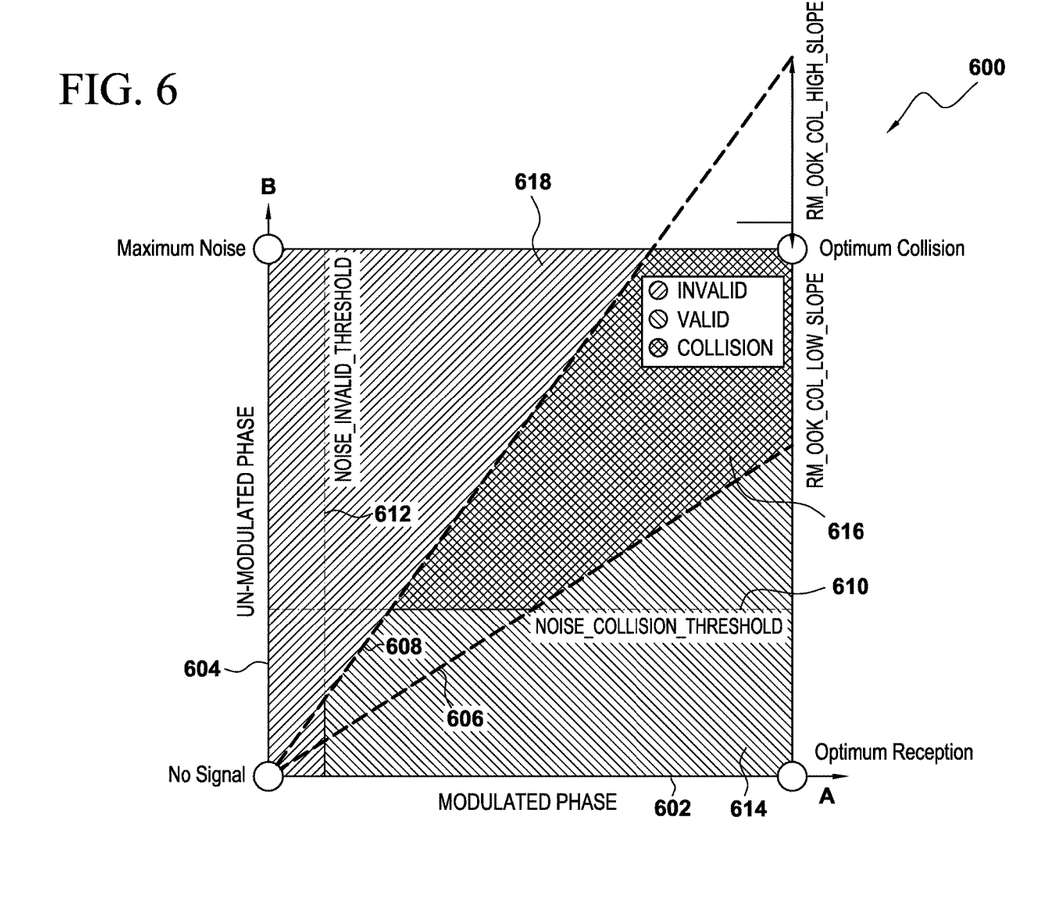
FIG. 6 illustrates an exemplary diagram showing the classification of the received RF signal according to a generalized method.

FIG. 6 illustrates an exemplary diagram showing the classification of the received RF signal according to the generalized method. The diagram 600 illustrates an implementation of the method discussed above. The diagram 600 includes a horizontal axis 602 and a vertical axis 604. The horizontal axis 602 represents the variable A. The vertical axis 604 represents the variable B. The diagram 600 includes two dotted lines 606, 608. The dotted line 606 implements the equation B=X2*A. The dotted line 608 implements the equation B=X1*A. The diagram 600 includes two threshold lines 610, 612. The threshold line 610 is the noise collision threshold, and it implements the equation B=NCT. The threshold line 612 is the noise invalid threshold and it implements the equation A=NIT. The diagram 600 includes three regions 614, 616, 618. The region 614 is the valid data region. The region 616 is the collision data region. The region 618 is the invalid data region. A received RF signal with a particular variable A and a particular variable B may fall within one of the three regions 614, 616, and 618, and hence may be classified accordingly.

In one embodiment, in order to increase classification accuracy, a finite state machine (FSM) may be used. The classification may be made dependent on the different states of the reader 102, such as a waiting-for-data state and a receiving-data state. In the waiting-for-data state, the reader 102 may be programmed to distinguish between invalid data and valid data using only the first 4 bits of the received RF signal. When the digital gain control loop (DGRM) does not adapt the gain during the state of frame (SOF) bit, the reader 102 will use the first 5 bits, including the SOF bit and the following 4 bits. In the waiting-for-data state, if the reader 102 classifies the received RF signal as invalid data, the reader 102 will remain in the waiting-for-data state. If the reader 102 classifies the received RF signal valid data, the reader 102 will proceed to the receiving-data state. Once the reader 102 is in the receiving-data state, the classification may be made only between valid data and collision data.

What is claimed is:

1. A method for classifying received radio frequency signals, comprising:
   receiving an input signal;
   matched filtering the input signal to produce a correlation result signal;
   sampling the correlation result signal at a half-bit-grid and a bit-grid of a plurality of bits to produce a set of modulated phase correlation result samples and a set of non-modulated phase correlation result samples;
   calculating a minimum of the set of modulated phase correlation result samples;
   calculating a maximum of the set of non-modulated phase correlation result samples; and
   classifying the input signal as valid data or collision data based on the calculated minimum and the calculated maximum.

2. The method of claim 1, wherein the sampling of the correlation result signal at the half-bit-grid and the bit-grid of the plurality of bits to produce the set of modulated phase correlation result samples and the set of non-modulated phase correlation result samples comprises:
   sampling the correlation result signal at the half-bit-grid and the bit-grid of each of the plurality of bits to produce a half-bit-grid sampled value and a bit-grid sampled value;

conducting a comparison of the half-bit-grid sampled value and the bit-grid sampled value associated with each of the plurality of bits;
assigning a greater value of each comparison to the set of modulated phase correlation result samples; and
assigning a lesser value of each comparison to the set of non-modulated phase correlation result samples.

3. The method of claim 1, wherein classifying the input signal as valid data or collision data based on the calculated minimum and the calculated maximum comprises:
subtracting the calculated maximum from the calculated minimum to produce a guard distance;
classifying the input signal as valid data when the calculated maximum is not greater than the guard distance; and
classifying the input signal as collision data when the calculated maximum is greater than the guard distance.

4. The method of claim 3, further comprising:
classifying the input signal as invalid data when the guard distance is less than a predetermined threshold.

5. The method of claim 1, wherein classifying the input signal as valid data or collision data based on the calculated minimum and the calculated maximum comprises:
classifying the input signal as invalid data when the calculated maximum is not smaller than a product of the calculated minimum and a first slope or when the calculated minimum is not greater than a noise invalid threshold;
classifying the input signal as collision data when the calculated maximum is not smaller than a product of the calculated minimum and a second slope, the calculated maximum is greater than a noise collision threshold, and the input signal is not classified as invalid data; and
classifying the input signal as valid data when the input signal is not classified as invalid data and the input signal is not classified as collision data.

6. The method of claim 1, wherein the classifying depends on a waiting-for-data state or a receiving-data state.

7. The method of claim 6, wherein
the classifying is conducted between invalid data and valid data during the waiting-for-data state; and
the classifying is conducted between valid data and collision data during the receiving-data state.

8. The method of claim 1, wherein the classifying is conducted based on a first 5 bits, 4 bits, 2 bits, or 1 bit of the input signal.

9. A collision detection system for classifying received radio frequency signals, comprising:
a receiver configured to receive an input signal;
a matched filter configured to matched filter the input signal to produce a correlation result signal;
a collision detector configured to:
sample the correlation result signal at a half bit grids, half-bit-grid and a bit-grid of a plurality of bits to produce a set of modulated phase correlation result samples and a set of non-modulated phase correlation result samples;
calculate a minimum of the set of modulated phase correlation result samples;
calculate a maximum of the set of non-modulated phase correlation result samples; and
classify the input signal as valid data or collision data based on the calculated minimum and the calculated maximum.

10. The collision detection system of claim 9, wherein the collision detector configured to sample the correlation result signal at the half-bit-grid and the bit-grid of the plurality of bits to produce the set of modulated phase correlation result samples and the set of non-modulated phase correlation result samples comprises:
the collision detector configured to:
sample the correlation result signal at the half-bit-grid and the bit-grid of each of the plurality of bits to produce a half-bit-grid sampled value and a bit-grid sampled value;
conduct a comparison of the half-bit-grid sampled value and the bit-grid sampled value associated with each of the plurality of bits;
assign a greater value of each comparison to the set of modulated phase correlation result samples; and
assign a lesser value of each comparison to the set of non-modulated phase correlation result samples.

11. The collision detection system of claim 9, wherein the collision detector configured to classify the input signal as valid data or collision data based on the calculated minimum and the calculated maximum comprises:
the collision detector configured to:
subtract the calculated maximum from the calculated minimum to produce a guard distance;
classify the input signal as valid data when the calculated maximum is not greater than the guard distance; and
classify the input signal as collision data when the calculated maximum is greater than the guard distance.

12. The collision detection system of claim 11, wherein the collision detector is further configured to:
classify the input signal as invalid data when the guard distance is less than a predetermined threshold.

13. The collision detection system of claim 9, wherein the collision detector configured to classify the input signal as valid data or collision data based on the calculated minimum and the calculated maximum comprises:
the collision detector configured to:
classify the input signal as invalid data when the calculated maximum is not smaller than a product of the calculated minimum and a first slope or when the calculated minimum is not greater than a noise invalid threshold;
classify the input signal as collision data when the calculated maximum is not smaller than a product of the calculated minimum and a second slope, the calculated maximum is greater than a noise collision threshold, and the input signal is not classified as invalid data; and
classify the input signal as valid data when the input signal is not classified as invalid data and the input signal is not classified as collision data.

14. The collision detection system of claim 9, wherein the collision detector is further configured to classify the input signal depending on a waiting-for-data state or a receiving-data state.

15. The collision detection system of claim 14, wherein the collision detector is further configured to:
classify between invalid data and valid data during the waiting-for-data state; and
classify between valid data and collision data during the receiving-data state.

16. The collision detection system of claim 9, wherein the collision detector is further configured to classify based on a first 5 bits, 4 bits, 2 bits, or 1 bit of the input signal.

* * * * *